(12) United States Patent
Wu et al.

(10) Patent No.: US 7,292,528 B2
(45) Date of Patent: Nov. 6, 2007

(54) METHOD AND APPARATUS TO FACILITATE INDEPENDENT PROTECTION SWITCHING IN A DISTRIBUTED NETWORK

(75) Inventors: Wei William Wu, Petaluma, CA (US); Jim Z. Mao, Rohnert Park, CA (US); Ming Jun Zhang, Petaluma, CA (US)

(73) Assignee: Turin Networks, Petaluma, CA (US)

( * ) Notice: Subject to any disclaimer, the term of this patent is extended or adjusted under 35 U.S.C. 154(b) by 341 days.

(21) Appl. No.: 09/874,098

(22) Filed: Jun. 4, 2001

(65) Prior Publication Data

US 2005/0036493 A1 Feb. 17, 2005

(51) Int. Cl.
*G01R 31/08* (2006.01)

(52) U.S. Cl. ......................... 370/228; 370/225

(58) Field of Classification Search .................. 370/216, 370/217, 218, 219, 220, 221, 222, 223, 224, 370/225, 227, 228, 351, 352, 353, 354, 401, 370/403, 404, 405, 406

See application file for complete search history.

(56) References Cited

U.S. PATENT DOCUMENTS

| | | | |
|---|---|---|---|
| 5,537,393 A | 7/1996 | Shioda et al. | |
| 5,559,624 A | 9/1996 | Darcie et al. | |
| 5,838,924 A * | 11/1998 | Anderson et al. | 709/239 |
| 5,901,024 A * | 5/1999 | Deschaine et al. | 361/67 |
| 5,959,996 A | 9/1999 | Byers | |
| 6,075,785 A * | 6/2000 | Reveles et al. | 370/376 |
| 6,111,881 A * | 8/2000 | Soncodi | 370/395.32 |
| 6,160,647 A | 12/2000 | Gilliland et al. | |
| 6,317,426 B1 * | 11/2001 | Afanador et al. | 370/352 |
| 6,332,198 B1 * | 12/2001 | Simons et al. | 714/6 |
| 6,351,452 B1 * | 2/2002 | Koenig et al. | 370/217 |
| 6,353,593 B1 * | 3/2002 | Chen et al. | 370/216 |
| 6,381,238 B1 | 4/2002 | Hluchyj | 370/352 |
| 6,498,794 B1 * | 12/2002 | Tsukamoto et al. | 370/395.1 |
| 6,606,302 B2 * | 8/2003 | Delattre et al. | 370/230.1 |
| 6,608,836 B2 * | 8/2003 | Mao et al. | 370/419 |
| 6,643,269 B1 * | 11/2003 | Fan et al. | 370/254 |
| 6,687,247 B1 * | 2/2004 | Wilford et al. | 370/392 |
| 6,816,489 B1 * | 11/2004 | Patra et al. | 370/390 |
| 6,976,103 B1 * | 12/2005 | Watanabe et al. | 710/74 |
| 7,050,428 B1 | 5/2006 | Dove et al. | 370/376 |
| 7,130,276 B2 * | 10/2006 | Chen et al. | 370/247 |

* cited by examiner

*Primary Examiner*—Phirin Sam
(74) *Attorney, Agent, or Firm*—Blakely, Sokoloff, Taylor & Zafman LLP

(57) ABSTRACT

A method and apparatus to establish independence between nodes in a distributed network during protection switching. A translation module that may include a cross connect table is introduced onto a backplane of a line card between a switch fabric and an egress time slot interchange (ETSI) module. Logical identifiers are assigned to the inputs of the ETSI module during system initialization. After initialization, the logical identifiers remain fixed. The translation module maps physical identifiers for incoming signals to the logical identifiers. If a line outage occurs, the translation module remaps the physical identifier for the protection line to the logical identifier corresponding to the failed line.

14 Claims, 3 Drawing Sheets

METHOD AND APPARATUS TO FACILITATE INDEPENDENT PROTECTION SWITCHING IN A DISTRIBUTED NETWORK

FIELD OF THE INVENTION

The invention relates to networking. More specifically, the invention relates to control and protection switching in a network.

BACKGROUND

Framers are commonly used in networking systems. Frames are used to organize the flow of information over a network line. In the case of SYNnchronous Optical Network (SONET) frames, each frame may be viewed as carrying "n" synchronous payloads envelopes (SPEs) of 810 bytes. Conceptually, a frame may be thought of as $SPE_1$, $SPE_2, \ldots SPE_N$.

For SONET frames, the time consumed by each frame corresponds to 125 μs regardless of the number of SPEs carried per frame (i.e., "n"). Furthermore, the number of SPEs carried per frame remains constant from frame to frame. Thus, the number of SPEs carried per frame is indicative of the network line speed.

For example, a SONET networking line having only one SPE per frame (i.e., n=1) corresponds to a line speed of 51.840 Mbs (i.e., 810 bytes every 125 μs). Similarly, a SONET networking line having three SPEs per frame (i.e., n=3) corresponds to a line speed of 155.52 Mbs (i.e., 2430 bytes every 125 μs), a SONET networking line having forty eight SPEs per frame (i.e., n=48) corresponds to a line speed of 2.488 Gb/s (i.e., 38880 bytes every 125 μs), etc.

One SPE per 125 μs is referred to as an STS-1 signal. Thus, a 51.840 Mbs SONET networking line carries a single STS-1 signal; a 155.52 Mbs SONET networking line carries three STS-1 signals; and a 2.488 Gb/s SONET networking line carries forty eight STS-1 signals. Typically, each STS-1 signal may be viewed as corresponding to the same SPE position across different frames. Each STS-1 signal typically has an STS identifier (STS ID) corresponding to a line and relative position in the frame. Note that if the applicable networking line is optical "OC" is typically used instead of "STS" (e.g., OC-3, OC-48, etc.).

A network line couples a pair of networking systems (e.g., switches, routers, multiplexers, gateways, etc.) so that the pair of networking systems may communicate with one another. Examples of networking lines include fiber optic or copper cable. Networking systems are typically provided with an automatic protection switch (APS) on the line card of the network element to switch signals between a working line and a separately provided protection line in the event of a line failure of the working line. This results in a change of the STS ID corresponding to a particular STS-1. The resulting change must be propagated between line cards in the network such that the protection switch for downstream line cards is dependent on the upstream line cards. For example, when a double failure occurs, the downstream node must be provided the status for both failing lines to allow flows to be properly routed.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
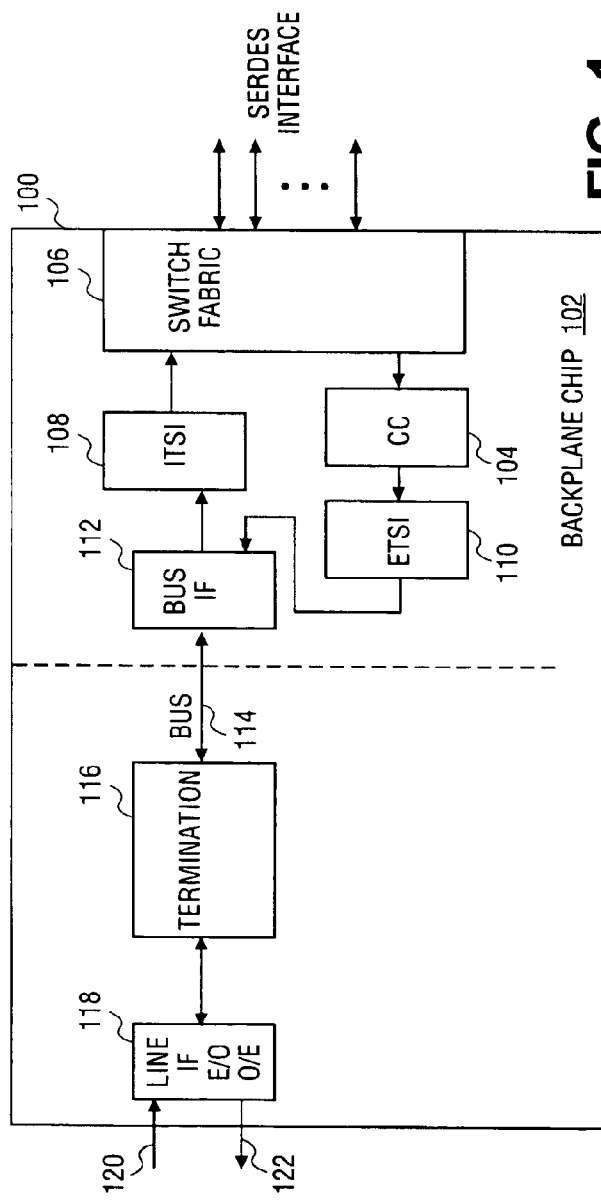
FIG. 1 is a block diagram of a line card of one embodiment of the invention.

FIG. 1 is a block diagram of a line card of one embodiment of the invention. An ingress line 120 from a distributed network comes into line interface 118. Line interface 118 includes an electrical to optical (E/O) and an optical to electrical (O/E) converter. The line interface forwards the incoming signals from ingress line 120 through bus termination unit 116 via bus 114 to a bus interface 112 in the backplane 102 of the line card 100. In one embodiment, the line card 100 is part of a SONET network. In one embodiment, bus 114 may carry signals at a rate from STS-1 to STS-48 to and from the bus interface 112. Bus interface 112 forwards incoming signals to an ingress time slot interchange (ITSI) module 108. The signals are then forwarded on to switch fabric 106 which may perform switching and routing functions on the signals. The switch fabric 106 may also be coupled a serdes (Serializer/Deserializer) interface. The switch fabric is also coupled through a translation module 104, which in one embodiment, may include a cross connect table. Outgoing signals are mapped by the translation unit to a set of logical identifiers corresponding to inputs of an egress time slot interchange unit (ETSI) 110. In some embodiments, the logical IDs are logical STS IDs and the cross connect maps physical STS IDs to the logical STS IDs. The logical identifiers are fixed at initialization of the line card 100. The cross connect table will keep the logical STS IDs unchanged, so the STS numbers transmitted by line 122 are fixed. The appropriately mapped signals are then forwarded by the ETSI 110 back through the bus interface 112 over bus 114 to bus termination unit 116. Line interface 118 performs appropriate conversion as necessary, and the outgoing signals are transmitted on egress line 122.

Figure 2:
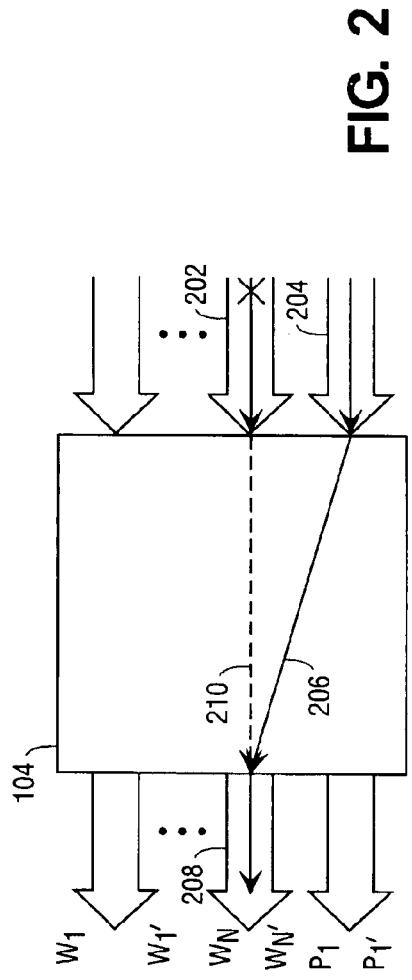
FIG. 2 is a schematic diagram of the functionality of the translation module.

FIG. 2 is a schematic diagram of the functionality of the translation module. Physical identifiers for the signals on a number of working lines (designated $W_x$) are provided to the right-hand side of a translation module 104. When a line failure occurs in the physical line corresponding to physical identifiers 202, the physical signals are rerouted onto the protection line (designated P). The protection line physical identifiers 204 are then remapped 206 to correspond to the mapping 210 of the physical line that failed. Thus, when the signals arrive at the translation module, either on the working line or a protection line, they are mapped to the same logical egress identifier.

Notably, this remapping method is suitably for implementation of various protection schemes in a wide array of SONET topologies. For example, it may be used in unidirectional path switched rings (UPSR), bi-directional line switched rings (BLSR), as well as 1:n protection and 1+1 protection topologies.

Figure 3:
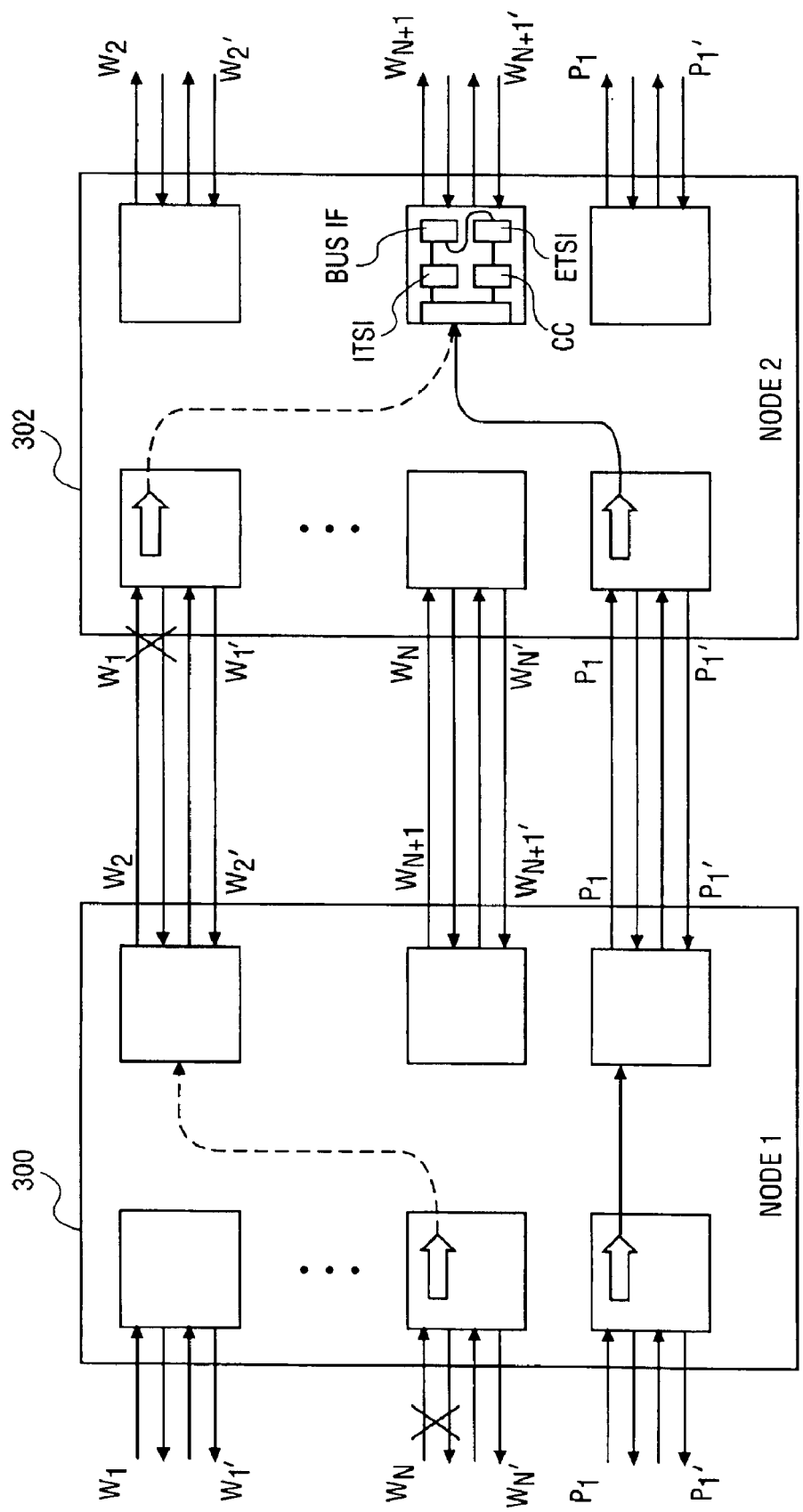
FIG. 3 is a block diagram of a system of one embodiment of the invention.

FIG. 3 is a block diagram of a system of one embodiment of the invention. A first node having a plurality of working line $W_x$ and at least one protection line P is coupled to a second node 302 and an analogous set of working and protection lines. Where a signal scheduled to come in to a first node 300 on working line $W_N$ and egress node 300 on working line $W_2$, if the line $W_N$ fails, the signal comes in to the first node 300 on the protection line P. Where as shown, the ingress of second node 302 $W_1$ line which is coupled to $W_2$ egress line of the first node 300 fails, rather than routing the signal up to $W_2$ within the first node 300, the protection line retains the signal, and the signal egresses the first node 300 on protection line $P_1$. Where that same signal was scheduled to egress the second node 302 on working line $W_{N+1}$, the translation module 104 in second node 302 routes that signal directly to egress $W_{N+1}$. For example, in FIG. 3, $W_{N+1}$'s output is decided by logical STS IDs. When $W_1$ fails, $P_1$ will send STS IDs to $W_{N+1}$ card. The cross connect table will change, but all logical STS IDs are kept unchanged. Because the output is only related to the logical STS IDs, the output looks unchanged, e.g., as though no line failure had occurred.

Figure 4:
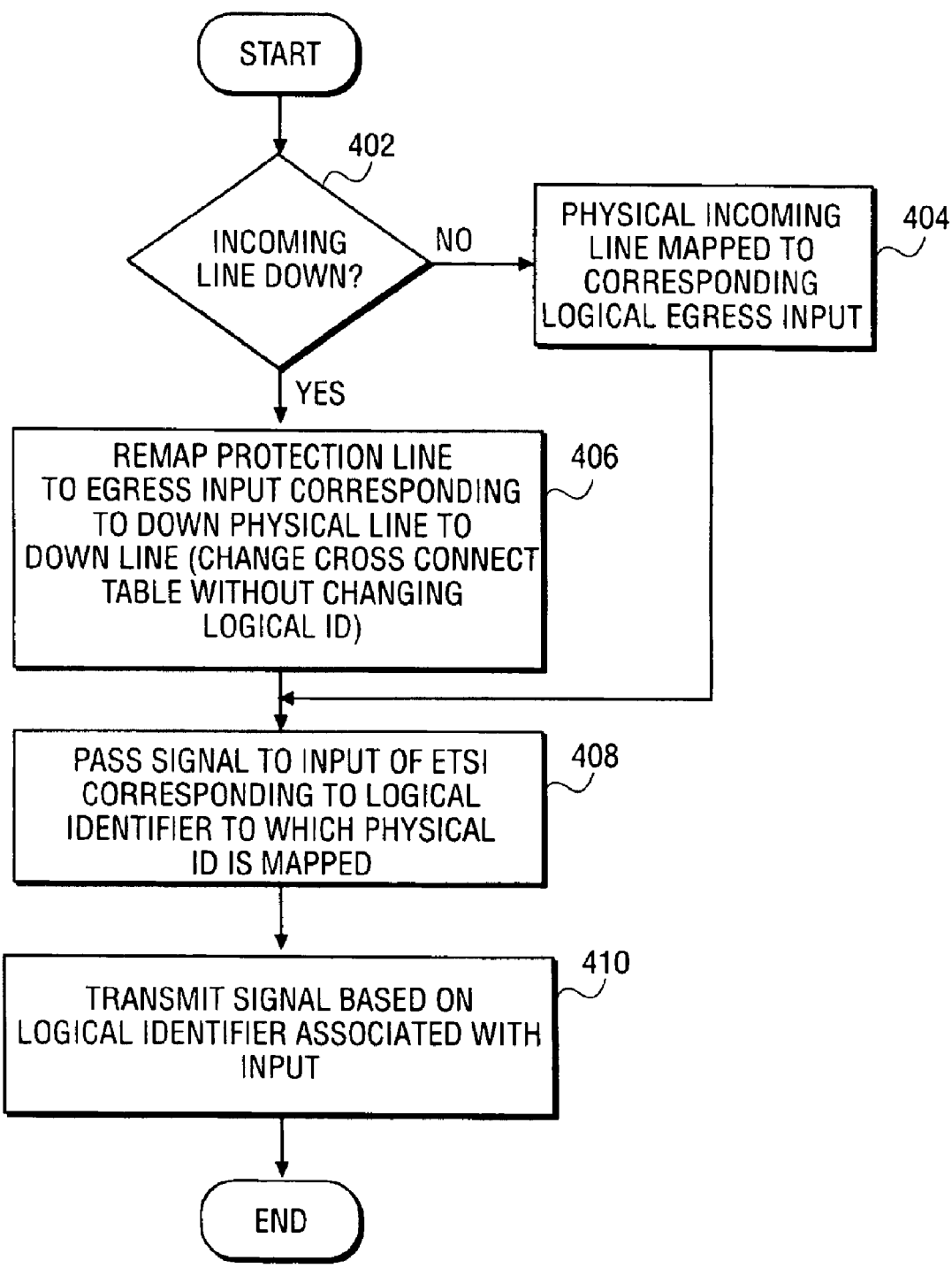
FIG. 4 is a flow diagram of backplane operation in one embodiment of the invention.

FIG. 4 is a flow diagram of backplane operation in one embodiment of the invention. A determination is made at decision block 402 whether a particular incoming line is down. If the line is not down, the physical incoming line is mapped to a corresponding logical ID of an egress input at functional block 404. If the incoming line is down, the protection line is remapped to the egress input corresponding to the down physical line at functional block 406. After the mapping or remapping, the signal is passed to the selected input of the egress time slot interchange unit at functional block 408. At functional block 410, the signals are transmitted based on the logical signal identifier associated with the input of the ETSI to which the signal is passed.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer-implemented method comprising:

fixing a logical identifier for a signal line at an input port of an egress time slot interchange (ETSI) of an egress interface of a line of a network element; the ETSI having a plurality of input ports, each having a signal line;

mapping via a translation module coupled to the ETSI a first physical identifier for a first physical signal line to the logical identifier; and the translation module remapping a second physical identifier for a second physical signal line to the logical identifier responsive to a line failure on the first physical signal line.

2. The method of claim 1 wherein mapping comprises:

writing to a cross connect table and wherein remapping comprises rewriting the cross connect table.

3. The method of claim 1 further comprising:

switching a signal from a second physical signal line to a physical line corresponding to the logical identifier responsive to the remapping.

4. The method of claim 1 wherein fixing comprises:

assigning an identifier to each port of the egress interface during initialization; and preventing change to the identifier after initialization.

5. The method of claim 1 wherein the signal line is a synchronous optical networking (SONET) line.

6. An apparatus comprising:

a bus interface;

An egress time slot interchange (ETSI) module;

a switch fabric coupled to the ETSI module;

an egress time slot interchange (ETSI) module having a plurality of inputs, each input assigned a logical identifier which remains fixed after initialization; and a translation module to translate an incoming signal identifier to one of the logical identifiers independent of a physical line on which the signal is received.

7. The apparatus of claim 6 wherein the translation module comprises:

a cross connect table.

8. The apparatus of claim 6 further comprising:

a bus coupled to the bus interface;

a termination module coupled to the bus; and a line interface having an optical to electrical (O/E) and electrical to optical (E/O) converter.

9. The apparatus of claim 6 wherein the apparatus is implemented as an ASIC on a backplane of a line card.

10. A machine-readable medium having instructions, which when executed by a processor, cause the processor to perform a method, the method comprising:

fixing a logical identifier for a signal line at an input port of an egress time slot interchange (ETSI) of an egress interface of a line card of a network element, the ETSI having a plurality of input ports, each having a signal line; mapping via a translation module coupled to the ETSI a first physical identifier for a first physical signal line to the logical identifier; and the translation module remapping a second physical identifier for a second physical signal line to the logical identifier responsive to a line failure on the first physical signal line.

11. The machine-readable medium of claim 10, wherein mapping comprises writing to a cross connect table and wherein remapping comprises rewriting the cross connect table.

12. The machine-readable medium of claim 10, wherein the method further comprises switching a signal from a second physical signal line to a physical line corresponding to the logical identifier responsive to the remapping.

13. The machine-readable medium of claim 10, wherein fixing comprises: assigning an identifier to each port of the egress interface during initialization; and preventing change to the identifier after initialization.

14. The machine-readable medium of claim 10, wherein the signal line a synchronous optical networking (SONET) line.

* * * * *